US012650044B2

(12) United States Patent
Reich et al.

(10) Patent No.: US 12,650,044 B2
(45) Date of Patent: Jun. 9, 2026

(54) PRESSING DEVICE FOR A WINDOW OR A DOOR

(71) Applicant: Roto Frank Fenster—und Tuertechnologie GmbH, Leinfelden-Echterdingen (DE)

(72) Inventors: Winfried Reich, Berglen (DE); Martin Krebs, St. Johann (DE); Choongeun Park, Stuttgart (DE)

(73) Assignee: Roto Frank Fenster—und Tuertechnologie GmbH, Leinfelden-Echterdingen (DE)

( * ) Notice: Subject to any disclaimer, the term of this patent is extended or adjusted under 35 U.S.C. 154(b) by 0 days.

(21) Appl. No.: 18/449,641

(22) Filed: Aug. 14, 2023

(65) Prior Publication Data

US 2023/0383583 A1 Nov. 30, 2023

Related U.S. Application Data

(63) Continuation of application No. PCT/EP2022/053848, filed on Feb. 16, 2022.

(30) Foreign Application Priority Data

Feb. 26, 2021 (DE) ..................... 10 2021 201 885.8

(51) Int. Cl.
*E05D 15/06* (2006.01)

(52) U.S. Cl.
CPC .... *E05D 15/0665* (2013.01); *E05Y 2201/474* (2013.01); *E05Y 2800/404* (2013.01); *E05Y 2900/132* (2013.01); *E05Y 2900/148* (2013.01)

(58) Field of Classification Search
CPC ........ E05D 15/0665; E05D 2015/1028; E05D 2015/1039; E05D 15/0669; E05D 15/066; E05D 15/0656; E05D 15/0678; E05Y 2201/474; E05Y 2800/404; E05Y 2900/132; E05Y 2900/148
See application file for complete search history.

(56) References Cited

U.S. PATENT DOCUMENTS 3,613,313 A 10/1971 Helmick
3,698,036 A * 10/1972 Goodman ........... E05D 15/0665 16/100

(Continued)

FOREIGN PATENT DOCUMENTS

AT 521828 A1 5/2020
BR 202013019420 U2 * 11/2015 ........... E05D 13/003

(Continued)

*Primary Examiner* — Daniel P Cahn
*Assistant Examiner* — Patrick B. Ponciano
(74) *Attorney, Agent, or Firm* — Orbit IP, LLP; Marc G. Martino

(57) ABSTRACT

A pressing device has a roller part, a control part and a fastening part. The pressing device can be mounted to a leaf of a window or door. The roller part is movable in the mounted state of the pressing device, in particular, vertically relative to the control part. The control part is movable horizontally to the fastening part in a positively controlled manner. A spring element is provided between the control part and the roller part in order to subject the roller part, in addition to the force of gravity, to a downwardly directed spring force, i.e., towards the running rail.

15 Claims, 4 Drawing Sheets

(56) References Cited

U.S. PATENT DOCUMENTS

| | | | | | |
|---|---|---|---|---|---|
| 3,959,849 | A | * | 6/1976 | Marquardt | E05D 15/0665<br>49/420 |
| 5,085,262 | A | * | 2/1992 | Tutikawa | E05D 15/0639<br>160/199 |
| 5,845,363 | A | * | 12/1998 | Brempell | E05D 15/0669<br>16/99 |
| 9,085,924 | B2 | * | 7/2015 | Tidwell | E05D 15/0669 |
| 10,077,594 | B2 | | 9/2018 | Fingerle | |
| 11,085,216 | B2 | * | 8/2021 | Reich | E05D 15/10 |
| 11,428,033 | B2 | * | 8/2022 | Beutel | E05D 15/0691 |
| 11,879,283 | B2 | * | 1/2024 | Duer | E05D 15/063 |
| 12,084,911 | B2 | * | 9/2024 | Lee | E05B 1/003 |
| 12,104,418 | B1 | * | 10/2024 | Krebs | E05D 15/10 |
| 12,180,763 | B2 | * | 12/2024 | Lee | E05D 15/06 |
| 12,297,681 | B2 | * | 5/2025 | Hooke | E06B 7/16 |
| 2010/0269415 | A1 | | 10/2010 | Busch | |
| 2019/0128035 | A1 | * | 5/2019 | Harari | E05D 15/1042 |
| 2019/0292828 | A1 | * | 9/2019 | Liu | E05B 3/00 |
| 2021/0262267 | A1 | | 8/2021 | Hoffmann et al. | |
| 2023/0039186 | A1 | * | 2/2023 | Hooke | E06B 7/16 |

FOREIGN PATENT DOCUMENTS

| | | | | | |
|---|---|---|---|---|---|
| CN | 205669368 | U | | 11/2016 | |
| CN | 208396525 | U | | 1/2019 | |
| CN | 110088420 | A | | 8/2019 | |
| CN | 210714254 | U | | 6/2020 | |
| CN | 112377055 | A | * | 2/2021 | E05D 15/0626 |
| DE | 20 2004 013 062 | U1 | | 10/2004 | |
| DE | 10 2007 032 474 | A1 | | 1/2009 | |
| DE | 102011101548 | A1 | * | 11/2012 | E05D 15/0665 |
| DE | 10 2014 220 837 | B3 | | 1/2016 | |
| DE | 10 2016 212 793 | B4 | | 4/2018 | |
| DE | 10 2016 225 385 | A1 | | 6/2018 | |
| DE | 10 2018 124 778 | A1 | | 4/2020 | |
| DE | 102020102023 | A1 | * | 7/2021 | E05D 15/10 |
| EP | 2281993 | A2 | * | 2/2011 | E05D 15/0665 |
| EP | 2 829 679 | B1 | | 2/2017 | |
| IT | 202300025221 | A1 | * | 5/2025 | E05D 15/12 |
| JP | H0868259 | A | * | 3/1996 | E05D 15/0639 |
| KR | 20-0387585 | Y1 | | 6/2005 | |
| KR | 20090098611 | A | * | 9/2009 | E06B 3/4636 |
| KR | 20100133213 | A | * | 12/2010 | E05D 15/0665 |
| KR | 20130003959 | U | * | 7/2013 | E05D 15/0669 |
| KR | 20200017091 | A | * | 8/2018 | E05D 15/565 |
| KR | 10-2019-0098182 | A | | 8/2019 | |
| KR | 20240171906 | A | * | 12/2024 | E06B 3/4627 |
| WO | 2014/016823 | A1 | | 1/2014 | |
| WO | 2017/179062 | A1 | | 10/2017 | |
| WO | 2018/011234 | A1 | | 1/2018 | |
| WO | 2018/114337 | A1 | | 6/2018 | |
| WO | 2019/029838 | A1 | | 2/2019 | |

* cited by examiner

-prior art-

-prior art-

PRESSING DEVICE FOR A WINDOW OR A DOOR

CROSS-REFERENCE TO RELATED APPLICATIONS

This continuation application claims priority to PCT/EP2022/053848 filed on Feb. 16, 2022, which has published as WO 2022/179915 A1, and also the German application number 10 2021 201 885.8 filed on Feb. 26, 2021, the entire contents of which are fully incorporated herein with these references.

DESCRIPTION

Field of the Invention

The invention relates to a pressing device for a window or a door. The invention further relates to a window or a door having such a pressing device.

Background of the Invention

AT 521828 A1 discloses an arrangement for guiding a folding sliding door. The arrangement comprises a carriage having spring-loaded running rollers.

Furthermore, DE 10 2007 032 474 A1 discloses providing a carriage with a spring-loaded running roller.

DE 20 2004 013 062 U1 discloses a device for arranging a folding door on a running rail using a suspension.

In the case of windows or doors having a leaf that can be moved away from the fixed frame, two carriages are generally sufficient to mount the leaf on a running rail. These two carriages are each preferably positioned under glass blocks in order to transfer the weight of the glass into the sill without a lever, and thus without the resulting bending torque on the leaf profile. The two glass blocks and thus also the two carriages are each located in the two, mutual end regions of the lower leaf profile.

Above a certain leaf width, a third carriage is sometimes additionally inserted and positioned between the two side carriages. This is necessary in order to ensure that the larger window or the larger door is tight and resistant to wind loads, since carriages also assume the function of a closing point. This central carriage is not designed to take the load of the leaf weight.

However, the problem can arise that this third carriage is overloaded due to the unpredictable external influences. These influences are primarily the sagging of the lower leaf profile in the center and the curvature or unevenness of the running rail (directions: up/down and inside/outside) for various reasons. If the distance between the central region of the lower leaf profile and the running rail is reduced for the unpredictable reasons mentioned above, the running rollers of the central carriage can be overloaded and possibly fail.

If the distance between the central region of the lower leaf profile and the running rail increases for the unforeseeable reasons mentioned above, the running rollers of the central carriage can lose contact with the running rail and no longer press the leaf correctly.

SUMMARY OF THE INVENTION

Object of the Invention

The object of the invention is therefore to provide a pressing device that tolerates unevenness of the running rail.

It is a further object of the invention to provide a window or a door having such a pressing device.

Description of the Invention

This object is achieved according to the invention by a pressing device according to claim 1 and a window or a door according to claim 12. The dependent claims reflect preferred developments.

The object according to the invention is thus achieved by a pressing device comprising a fastening part having a guide slot, a control part having a control slot, a roller part having at least one running roller, and a driving bar having a control pin that extends through the guide slot and into the control slot, wherein the roller part can be moved towards and/or away from the fastening part.

The, in particular, vertical mobility of the roller part relative to the fastening part makes it possible to compensate for vertical unevenness of the running rail when the leaf is displaced. A transfer of weight forces is prevented. Furthermore, the at least one running roller makes it possible for the pressing device to follow the running rail even when the running rail is not in a straight line, but is bent inwards and/or outwards, at least in portions.

Preferably, the pressing device has a spring element that acts upon the roller part with a spring force that tends to move the roller part away from the fastening part. As a result, it can be ensured that the pressing device follows the running rail even if the running rail is very uneven.

The spring element can be designed in the form of a compression spring. This allows for a structurally simple configuration of the pressing device.

Preferably, the spring element is designed in the form of a spiral spring.

Jamming can be reliably prevented if the pressing device has a guide for moving the roller part on the control part.

The pressing device safely follows the running rail if the roller part has a further running roller for rolling on the running rail.

The actuation of the pressing device is particularly easy for a user when the control pin has a guide roller for guiding the control pin in the guide slot and/or a control roller for guiding the control pin in the control slot. The guide slot and/or the control slot can be designed in the form of an elongated hole.

The guide roller and/or the control roller can be arranged on the control pin so as to be guided by bearings, and, in particular, guided by rolling bearings.

The production of the pressing device is further simplified if the control roller is formed in one piece with the control pin.

In a particularly preferred embodiment of the invention, the pressing device has a pressing element on the roller part for abutment on the fixed frame. The, in particular, vertical mobility of the roller part ensures that the pressing element does not slip on the running rail and always has a secure contact for support on the fixed frame. For low-friction and low-noise displacement of the leaf, the pressing element can be designed as a pressing roller.

The axis of the pressing roller preferably runs perpendicular to the axis of the at least one running roller. Alternatively or additionally, the axis of the pressing roller preferably extends perpendicular to the longitudinal direction of the guide slot.

The object according to the invention is further achieved by a window or a door having at least one pressing device described herein. The pressing device is fastened to the leaf.

The at least one pressing device is preferably fastened to the underside of the leaf. The window or the door can have further pressing devices that are preferably likewise fastened to the underside of the leaf.

Further preferably, the window or the door has at least two, and, in particular, exactly two, carriages on the underside of the leaf, wherein the pressing device is arranged between the two carriages.

Further advantages of the invention can be found in the description and the drawings. Likewise, according to the invention, the aforementioned features and those which are to be explained below can each be used individually or together in any desired combinations. The embodiments shown and described are not to be understood as an exhaustive list, but, rather, have an exemplary character for the description of the invention.

DETAILED DESCRIPTION OF EMBODIMENTS OF THE INVENTION

Figure 1C:
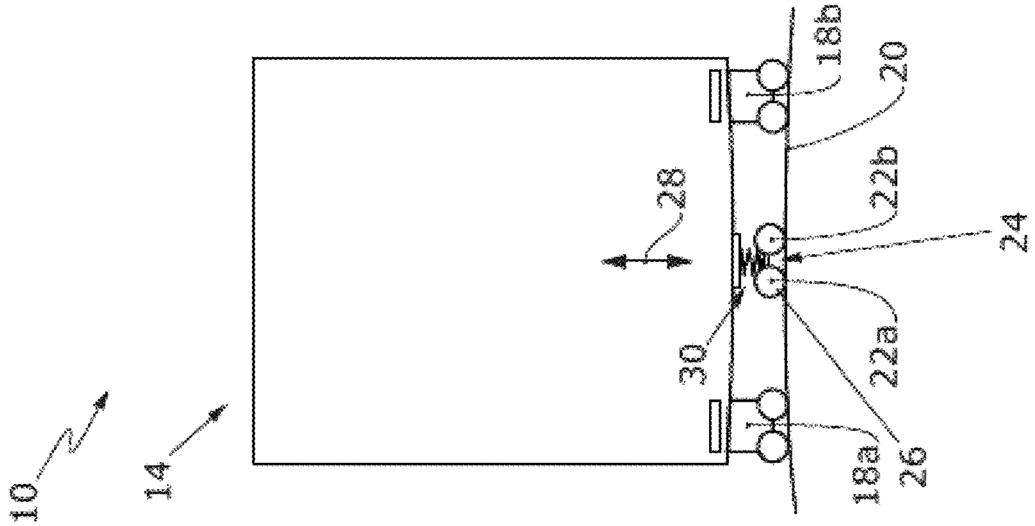
FIG. 1*c* is a schematic side view of the door according to FIG. 1*b* with the pressing device according to the invention.
Figure 1B:
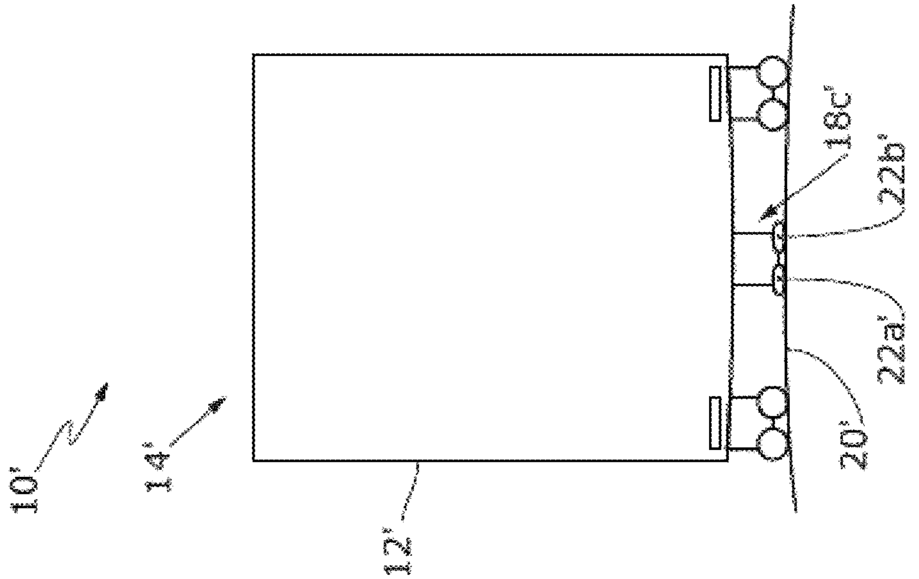
FIG. 1*b* is a schematic side view of the door according to FIG. 1*b* with an uneven running rail.
Figure 1A:
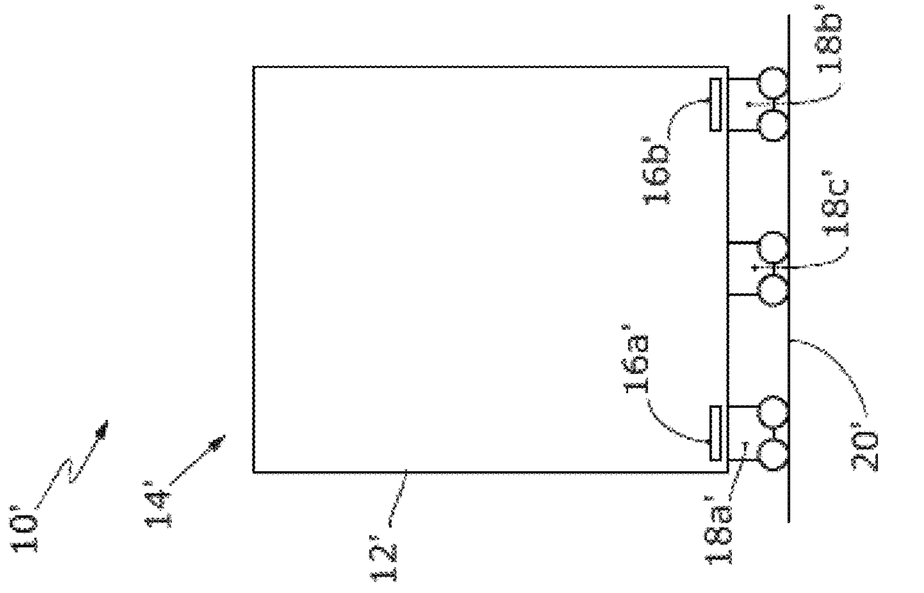
FIG. 1*a* is a schematic side view of a door according to the prior art in ideal conditions.

FIG. 1*a* shows a door 10' with a fixed frame 12' and a leaf 14'. The leaf 14' has a glass pane (not shown in FIG. 1*a*) that is supported on glass blocks 16*a*', 16*b*'. The weight of the leaf 14' is transferred via carriages 18*a*', 18*b*' to a running rail 20' of the fixed frame 12'.

The carriages 18*a', b'* also serve as pressing devices or closing points for the leaf 14'. In the case of very large leaves 14', it is necessary in some cases to provide one or more additional pressing devices or closing points. This is generally achieved in the prior art by the arrangement of at least one further carriage 18*c'*.

FIG. 1*b*, however, shows the disadvantages of such an additional carriage 18*c*'. If the running rail 20' is uneven and/or the leaf 14' of the door 10' is sagging, there may be a high load on running rollers 22*a*', 22*b*'of the carriage 18*c'*.

FIG. 1*c* schematically shows an embodiment according to the invention for solving the problem. A pressing device 24 is provided on a leaf 14 of a door 10. The pressing device 24 has a roller part 26 having at least one running roller 22*a*, 22*b*. The running rollers 22*a, b* are guided on a running rail 20.

The roller part 26 can be moved at least vertically, i.e., in the direction of an arrow 28, relative to the leaf 14. In the present case, the roller part 26 is indirectly or directly connected to the leaf 14 via a spring element 30.

Figure 2B:
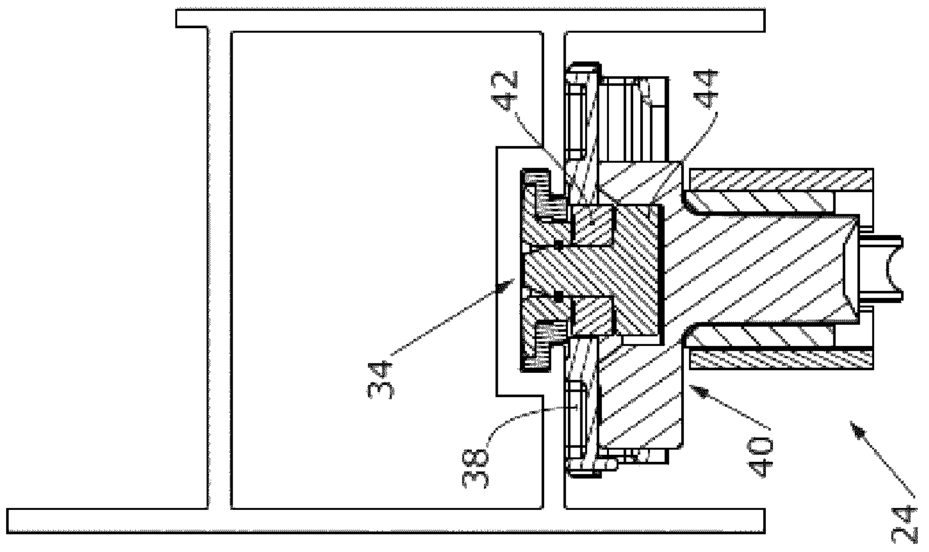
FIG. 2*b* is a sectional view of the pressing device on the leaf according to FIG. 2*a*.
Figure 2A:
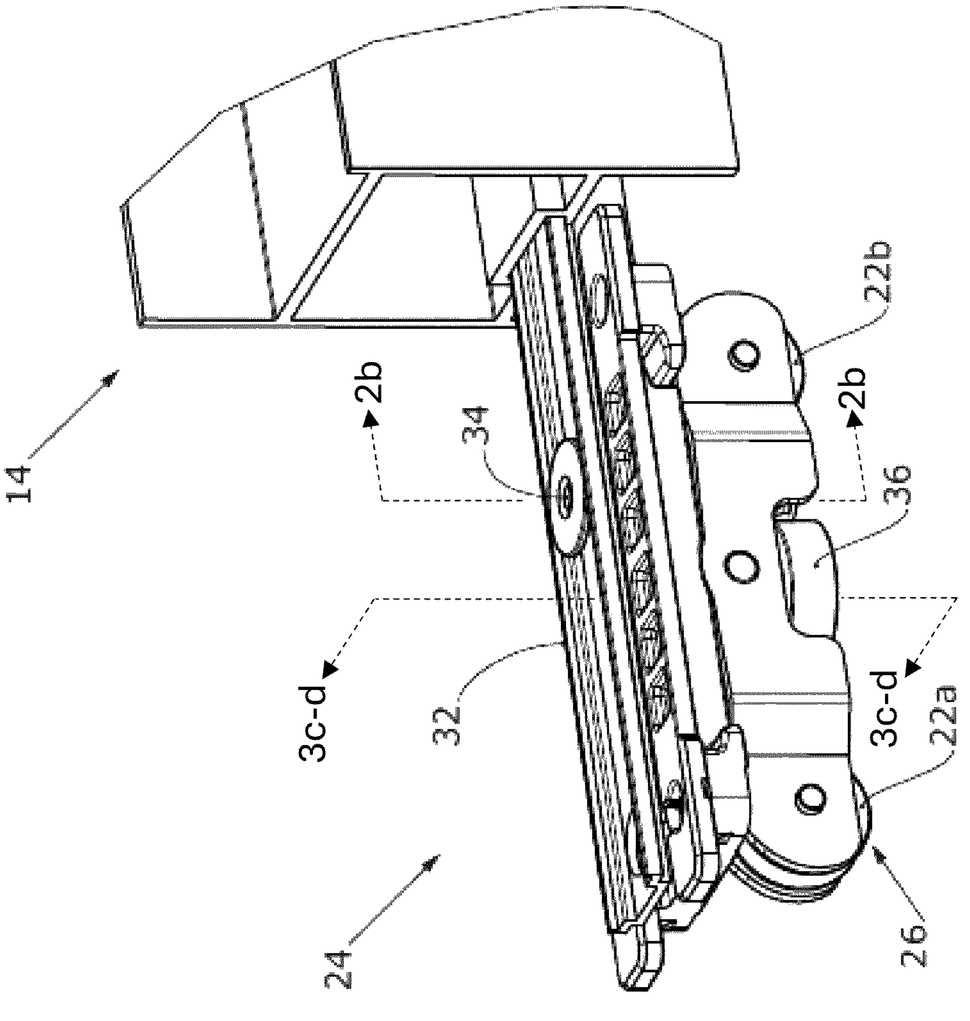
FIG. 2*a* is an isometric view of a pressing device on a leaf.

FIG. 2*a* shows a pressing device 24 on a leaf 14. The pressing device 24 has a driving bar 32 on which a control pin 34 (see also FIG. 2*b*) is arranged or formed. A roller part 26 has at least one running roller 22*a*, 22*b*.

The roller part 26 has a pressing element 36, in this case in the form of a pressing roller, for supporting the roller part 26 perpendicularly to the longitudinal axis of the driving bar 32.

A movement of the driving bar 32 in the direction of its longitudinal axis, and thus a movement of the control pin 34, causes a forced movement of the roller part 26 transverse, and, in particular, perpendicular, to the longitudinal axis of the driving bar 32.

FIG. 2*b* shows the pressing device 24 in a sectional view. The pressing device 24 has a fastening part 38 for fastening the pressing device 24 to the leaf 14 and a control part 40. It can also be seen from FIG. 2*b* that the control pin 34 has a guide roller 42 and a control roller 44.

Figure 3B:
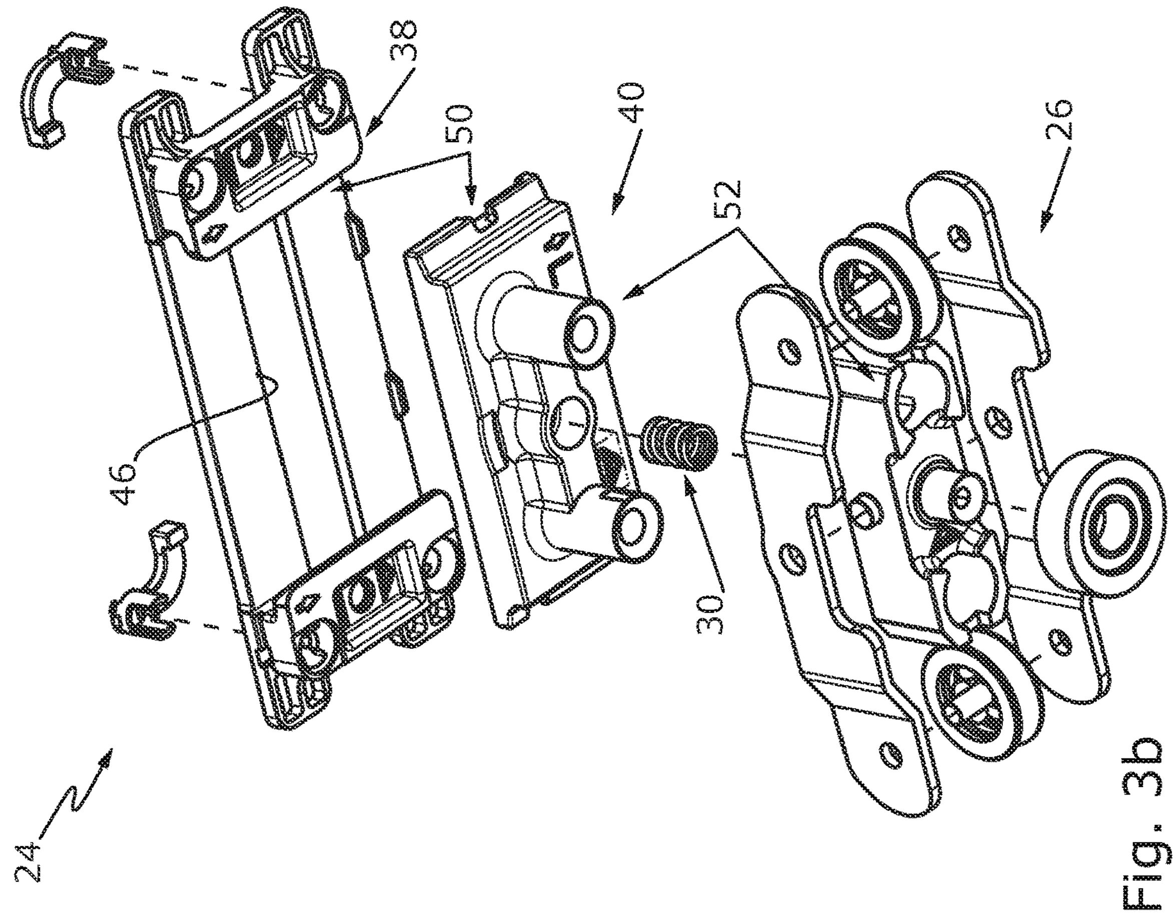
FIG. 3*b* is an exploded view of the pressing device according to FIG. 3*a*.
Figure 3A:
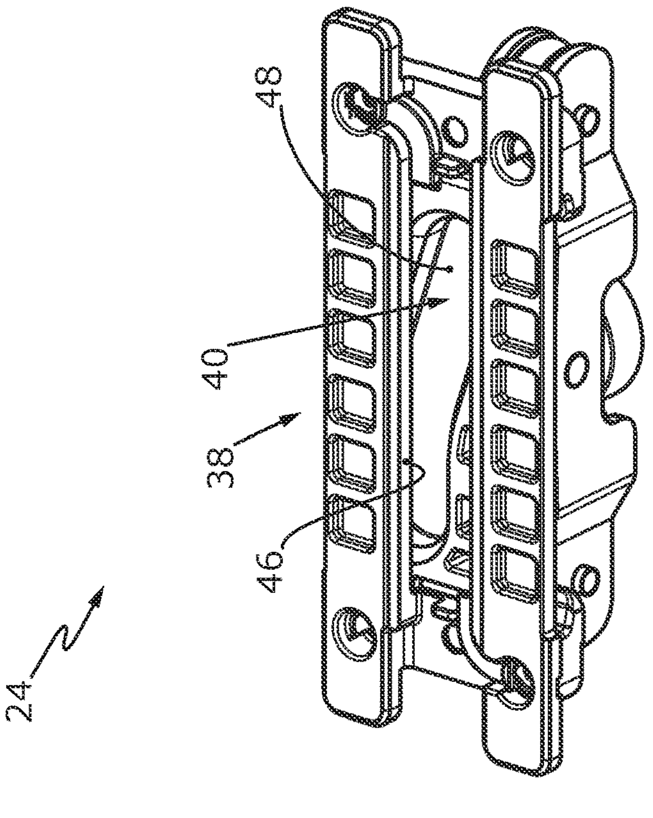
FIG. 3*a* is an isometric view of the pressing device from FIG. 2*a* without a driving bar and without a control pin.

FIG. 3*a* shows a part of the pressing device 24 having the fastening part 38 and the roller part 26. The fastening part 38 has a guide slot 46 for guiding the guide roller 42 (see FIG. 2*b*). The control part 40 has a control slot 48 for guiding the control roller 44 (see FIG. 2*b*).

FIG. 3*b* shows the structure of the pressing device 24 having the fastening part 38, the control part 40, and the roller part 26. A fastening part guide 50, in this case in the form of a dovetail guide, can be provided for a movement of the control part 40 transverse, and, in particular, perpendicular, to the longitudinal axis of the guide slot 46.

Alternatively or additionally, the pressing device 24 can have a guide 52 for guiding the control part 40 on the roller part 26. The roller part 26 is movable vertically relative to the control part 40 or the fastening part 38.

In order to reliably press the roller part 26 onto the running rail 20 (see FIG. 1*c*), the pressing device 24 has a spring element 30 between the control part 40 and the roller part 26.

Figure 3C:
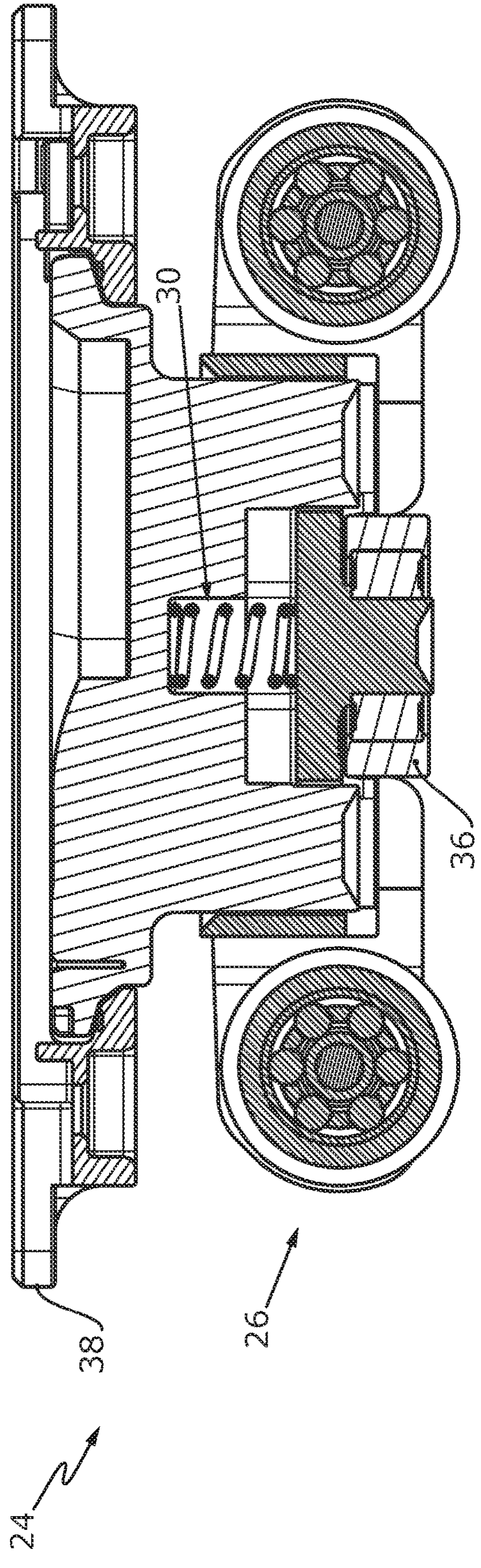
FIG. 3*c* is a sectional view of the pressing device according to FIG. 3*b*, wherein a roller part is lowered.
Figure 3D:
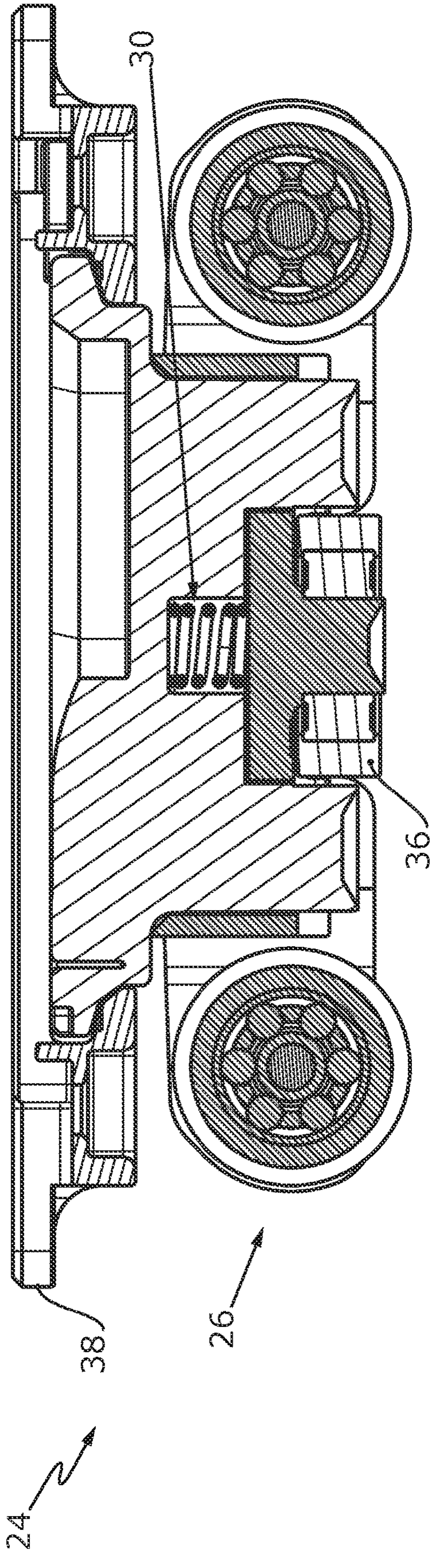
FIG. 3*d* is a sectional view of the pressing device according to FIG. 3*c*, wherein the roller part is moved towards a fastening part.

FIG. 3*c* shows the pressing device 24 having the roller part 26 spaced apart from the fastening part 38. FIG. 3*d* shows the pressing device 24, wherein the roller part 26 is moved towards the fastening part 38. From a combination of FIGS. 3*c* and 3*d*, it can be seen that the roller part 26 is movable towards the fastening part 38 against the spring force of the spring element 30 in order to be able to compensate for unevenness of the running rail 20 (see FIG. 1*c*).

The pressing element 36, in particular, guided by a rolling bearing, is displaceable together with the further parts of the roller part 26, so that the pressing element 36 does not slip on the running rail 20 even in the event of unevenness of the running rail 20 (see FIG. 1*c*).

Taking an overview of all figures of the drawings, the invention relates in summary to a pressing device 24 having a roller part 26, a control part 40, and a fastening part 38. The pressing device 24 can be mounted on a leaf 14 of a window or a door 10. The roller part 26 is movable, in the mounted state of the pressing device 24, in particular, vertically, relative to the control part 40. The control part 40 is movable horizontally with respect to the fastening part 38 in a positively-controlled manner. A spring element 30 can be provided between the control part 40 and the roller part 26 in order to subject the roller part 26, in addition to the force of gravity, to a downwardly directed spring force, i.e., towards the running rail 20.

LIST OF REFERENCE SIGNS

10 Door
12 Fixed frame

14 Leaf
16*a, b* Glass block
18*a-c* Carriage
20 Running rail
22*a, b* Running roller
24 Pressing device
26 Roller part
28 Arrow (direction of movement of the roller part 26)
30 Spring element
32 Driving bar
34 Control pin
36 Pressing element
38 Fastening part
40 Control part
42 Guide roller
44 Control roller
46 Guide slot
48 Control slot
50 Fastening part guide
52 Guide

What is claimed is:

1. A pressing device for a window or a door having a fixed frame, a running rail extending horizontally in a longitudinal direction, and a displaceable leaf, wherein the pressing device comprises:

a) a fastening part configured to be fastened to the leaf and has a guide slot extending horizontally in the longitudinal direction along the fastening part;

b) a control part having a control slot extending horizontally, wherein at least one portion of the control slot is slanted extending obliquely to the longitudinal direction;

c) a roller part having a running roller configured for rolling on the running rail in the longitudinal direction;

d) a driving bar having a control pin arranged or formed on the driving bar, the control pin extending through the guide slot and into the control slot;

wherein the fastening part is configured to move horizontally and perpendicular to the longitudinal direction in a positively-controlled manner relative to the control part; and wherein the roller part is configured to move vertically relative to the control part, and including a spring element biased between the roller part and the control part configured to compensate for a distance variation between the leaf and the running rail when the leaf is moved in the longitudinal direction;

wherein the window or the door has two carriages that are fastened to the underside of the leaf, wherein the pressing device is arranged between the two carriages, and wherein the two carriages do not include a spring element configured to compensate for a distance variation between the leaf and the running rail when the leaf is moved in the longitudinal direction.

2. The pressing device according to claim 1, wherein the spring element acts upon the roller part with a spring force away from the control part and in turn the fastening part.

3. The pressing device according to claim 2, wherein the spring element is a compression spring.

4. The pressing device according to claim 2, wherein the spring element is a spiral spring.

5. The pressing device according to claim 1, wherein the pressing device has a guide for moving the control part on the roller part.

6. The pressing device according to claim 1, wherein the roller part has a further roller for rolling on the running rail.

7. The pressing device according to claim 1, wherein the control pin has a guide roller for guiding the control pin in the guide slot and/or a control roller for guiding the control pin in the control slot.

8. The pressing device according to claim 7, wherein the guide roller and/or the control roller is arranged on the control pin so as to be guided by rolling bearings.

9. The pressing device according to claim 7, wherein the control roller is formed in one piece with the control pin.

10. The pressing device according to claim 1, wherein the roller part has a pressing element for abutment on the fixed frame.

11. The pressing device according to claim 10, wherein the pressing element is designed as a pressing roller, where an axis of the pressing roller is oriented to be perpendicular to an axis of the running roller.

12. The pressing device of claim 1, including the window or the door having the fixed frame, the displaceable leaf and the running rail, where the pressing device is fastened to the leaf.

13. The pressing device according to claim 12, wherein the pressing device is fastened to an underside of the leaf.

14. A window or a door, comprising:

a fixed frame;

a running rail extending horizontally in a longitudinal direction;

a displaceable leaf;

a pressing device, wherein the pressing device comprises:

a) a fastening part configured to be fastened to the leaf and has a guide slot extending horizontally in the longitudinal direction along the fastening part;

b) a control part having a control slot extending horizontally, wherein at least one portion of the control slot is slanted extending obliquely to the longitudinal direction;

c) a roller part having a running roller configured for rolling on the running rail in the longitudinal direction;

d) a driving bar having a control pin arranged or formed on the driving bar, the control pin extending through the guide slot and into the control slot;

wherein the fastening part is configured to move horizontally and perpendicular to the longitudinal direction in a positively-controlled manner relative to the control part; and wherein the roller part is configured to move vertically relative to the control part, and including a spring element biased between the roller part and the control part configured to compensate for a distance variation between the leaf and the running rail when the leaf is moved in the longitudinal direction;

wherein the pressing device is fastened to an underside of the leaf;

wherein the window or the door has two carriages that are fastened to the underside of the leaf; and wherein the pressing device is arranged between the two carriages.

15. The window or the door of claim 14, wherein the two carriages do not include a spring element configured to compensate for a distance variation between the leaf and the running rail when the leaf is moved in the longitudinal direction.

* * * * *